May 7, 1929.  G. REESE  1,711,966
AIR OPERATED FEEDER FOR SHAKER CONVEYERS
Original Filed Nov. 8, 1926   2 Sheets-Sheet 1
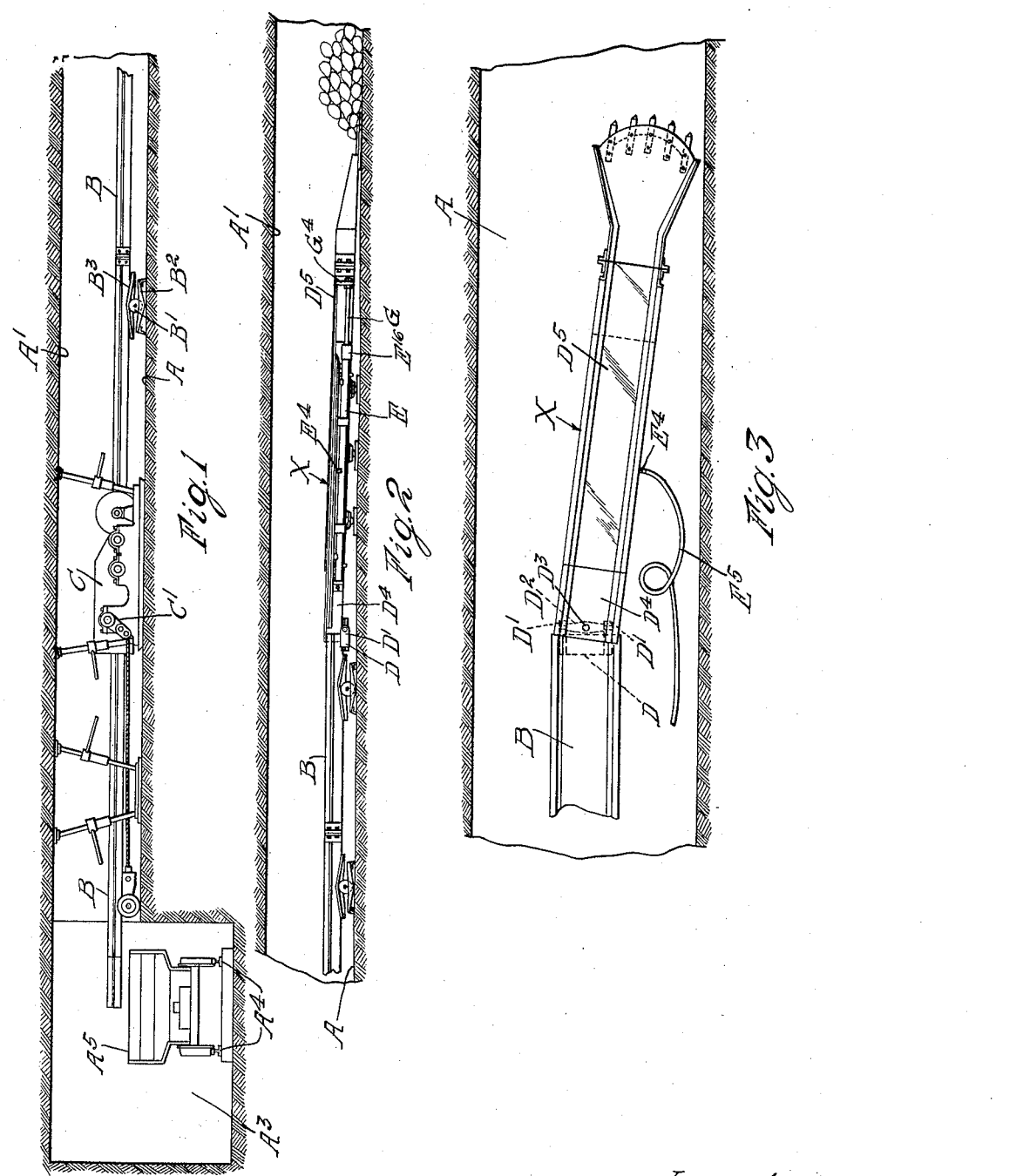
Inventor
Gomar Reese
by Parker & Carter
Attorneys.

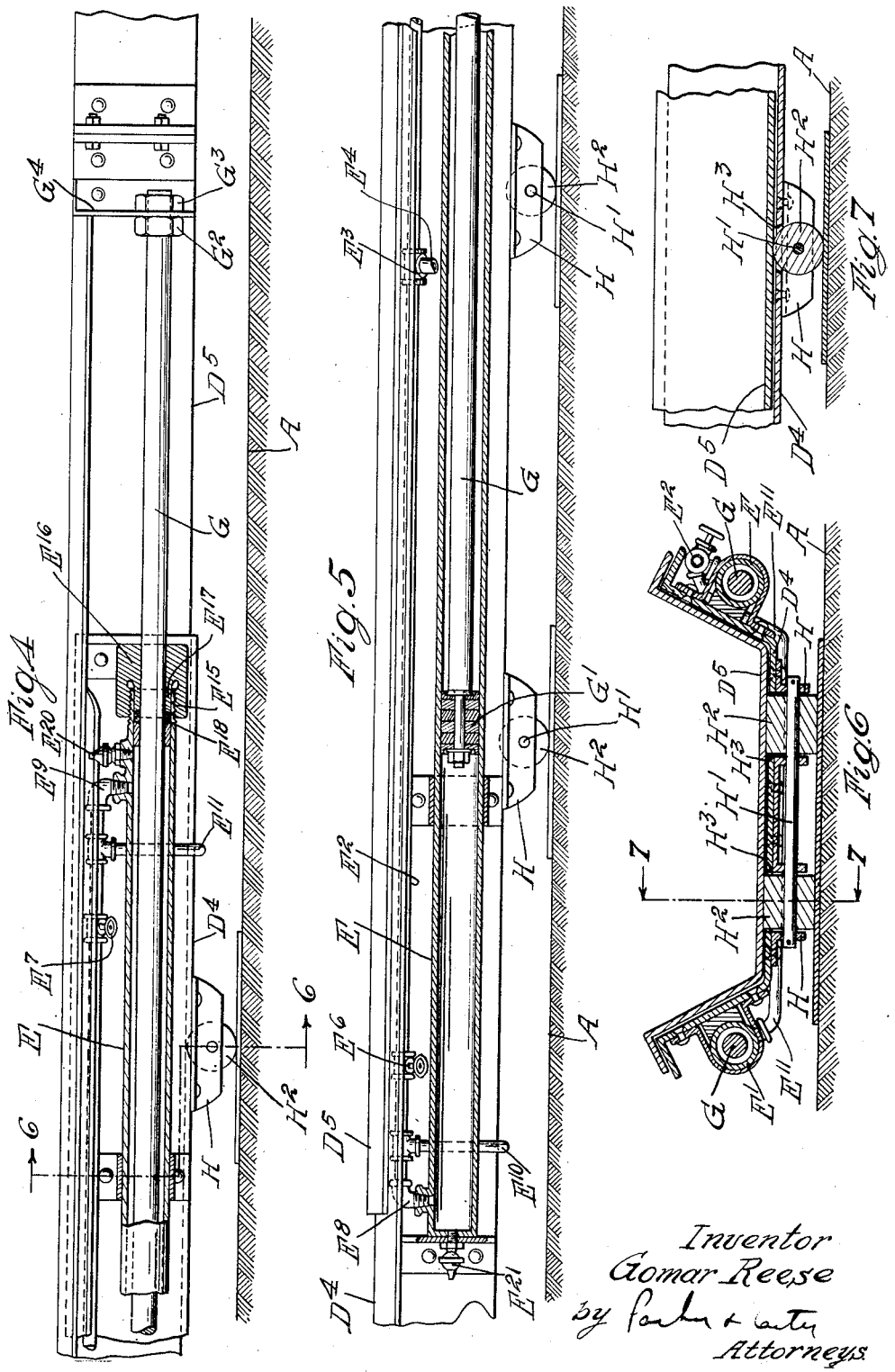

Patented May 7, 1929.

1,711,966

UNITED STATES PATENT OFFICE.

GOMAR REESE, OF KEMMERER, WYOMING, ASSIGNOR TO LINK-BELT COMPANY, OF CHICAGO, ILLINOIS, A CORPORATION OF ILLINOIS.

AIR-OPERATED FEEDER FOR SHAKER CONVEYERS.

Application filed November 8, 1926, Serial No. 146,983. Renewed July 5, 1928.

My invention relates to a feeding device for excavating or conveying machinery and particularly to a feeder for shaker or reciprocating conveyers. One object of my invention is the provision of feeding means for use with a feeding conveyer, whereby the conveyer may automatically feed itself or pick up the material to be conveyed. Another object is the provision of a combined excavating and conveying member whereby material may be fed to a reciprocating conveyer in response to the reciprocation of the conveyer. Another object is the provision of means for extending such a conveyer and feed therefor, in order to permit continuous feeding with a minimum number of adjustments. Other objects will appear from time to time throughout the specification and claims.

I illustrate my invention more or less diagrammatically in the accompanying drawings, wherein—

Figure 1 is a vertical longitudinal section of a typical conveyer;

Figure 2 is a similar section, in continuation of Figure 1, illustrating the feeding member as applied to the conveying member;

Figure 3 is a plan view;

Figures 4 and 5 are detail vertical sections on an enlarged scale;

Figure 6 is a section along the line 6—6 of Figure 4; and

Figure 7 is a section along the line 7—7 of Figure 6.

Like parts are indicated by like symbols throughout the specification and drawings.

Whereas I do not wish to limit myself to the particular employment of the feeding member herein shown, or to any particular conveyer, it is herein illustrated as employed with a reciprocating or shaking conveyer of the type wherein the conveyer is reciprocated in opposite directions at different speeds, for example, with a slow forward movement and a rapid rearward movement. Referring for example to Figures 1 and 2, A indicates the floor and $A^1$ the roof of a mine tunnel or passage. $A^3$ is a transverse passage containing for example the tracks $A^4$ adapted to guide any suitable conveying member or car $A^5$.

B is a conveyer trough or chute which may be reciprocated for example upon the rollers $B^1$, which rest upon the track members $B^2$ and support the upper track members $B^3$ upon the trough B.

C diagrammatically illustrates any suitable reciprocating means for said trough, including the crank arm $C^1$.

Referring to Figures 2 and 3, I illustrate the trough B as having secured to the forward end of the forward section the feeder member generally indicated as X. It will be understood that I may employ any suitable number of trough sections B, additional sections being inserted as the work progresses.

The securing means between the feeding member and the end of the trough B are as follows: Secured to the trough B is a yoke member D having the arms $D^1$, within which is pivoted the transverse member $D^2$. Upwardly projecting from said member $D^2$ is the vertical pin or pivot $D^3$ to which the feeding member is pivoted. It will be understood that the feeding member as a whole may rotate freely about either a vertical or a horizontal axis, there being in effect a universal connection between the conveyer trough B and the feeder X. The same securing means may also be used between any number of trough sections B as shown in Figure 3. The feeding member consists preferably of two separate troughs $D^4$ $D^5$, the upper trough $D^5$ being in slidable relation with the trough $D^4$, there being no connection between the trough $D^5$ and the conveyer B.

Positioned along the side flanges of the trough $D^4$ are a plurality of pistons E $E^1$. Associated with the piston E is the longitudinal supply passage $E^2$ having in it the T connection $E^3$ and the inlet member $E^4$ adapted to be connected, for example by the flexible conduit $E^5$, with any suitable pressure source, for example a source of compressed air. At either end of the conduit $E^2$ are the valves $E^6$ $E^7$ and beyond them the elbow members $E^8$ $E^9$ whereby the passage $E^2$ is put in communication with the interior of either end of the cylinder E. Positioned beyond the valves $E^6$ $E^7$ and extending to the ends of the cylinder $E^1$ are the transverse lines $E^{10}$ $E^{11}$, whereby both pistons are adapted to be put into communication with the pressure source simultaneously by the actuation of either of the valves $E^6$ $E^7$. Penetrating the cylinders E $E^1$ are the rods G having at the ends any suitable piston member $G^1$. The rods are secured at the outer ends, for example by means of the lock nuts $G^2$ $G^3$ and the angle members $G^4$ upon the sides of the upper trough $D^5$. The forward ends of the pistons E E¹ are outwardly screw threaded as at E¹⁵ to receive the closing and piston engaging plug E¹⁶. The inwardly projecting portion E¹⁷ engages any suitable packing E¹⁸.

It will be realized that when the actuating medium, for example compressed air, is admitted by the opening of the valve E⁶ to the inner ends of the two cylinders, the pistons are thrust forward, and thereby move the trough D⁵ in relation to the trough D⁴. The air pressure in the two pistons will necessarily be uniform owing to the cross connection E¹⁰. When air is admitted to the forward end of the pistons, the valve E⁶ being closed and the valve E⁷ being open, the piston is returned to its original position. The valves E²⁰ E²¹ may be employed to relieve the pressure and to permit a reversal in direction of movement of the piston as one admission valve is open and the other closed.

The lower trough D⁴ is provided with the lugs or angles H, positioned at a plurality of points along it, each such set of lugs having mounted therein the transverse shaft H¹ upon which is mounted the supporting roller H². The bottom of the lower trough is cut away as at H³, the upper portions of said rollers projecting upwardly therethrough to support the bottom of the trough D⁵.

It will be realized that whereas I have shown a practical and operative device nevertheless many changes might be made in the size, shape, number and disposition of parts without departing from the spirit of my invention. I therefore wish my drawings and description to be taken as in a broad sense illustrative and diagrammatic rather than as limiting me to my specific showing herein made.

The use and operation of my invention are as follows:

Reciprocating conveyers of the type herein shown are already known in the art, namely, conveyers which may be reciprocated at different velocities in opposite directions in order to convey material fed to them. Such conveyers may be employed for many purposes and may for example be employed in mining. Such a conveyer when so employed may be advanced from a given location by the insertion of additional conveyer sections as the shaft is lengthened, all such sections forming a single conveyer, reciprocated from a single power source. The material to be conveyed may be shot down from the end of the shaft or otherwise accumulated and is generally divided into lumps and particles of varying size. I mount upon the forward end of the conveyer a feeding member which is adapted to be thrust by the forward movement of the conveyer into the pile of material to be conveyed. The slow rearward movement of the feeding member conveys away the material received upon it as a result of the rapid forward thrust. However, when large quantities of material are thus rapidly rearwardly conveyed from the working face of the shaft, the face of the material available for excavation recedes. In order to permit the conveying and feeding to continue without the necessity of forwardly adjusting the conveyer I have provided the means above described for advancing the upper of the two troughs, in relation to the lower.

For ordinary adjustment, the upper trough D⁵ is advanced in relation to the lower trough D⁴ by hydraulic means. When it has reached its limit of advancement it may be returned by closing the connection with the inner end of the cylinders and opening the connection to the outer end, thus thrusting the pistons into the cylinders to their full length. An additional section of the conveyer may then be inserted, and the process continues as before.

I claim:

1. The combination with a reciprocatory conveyer of a longitudinally extensible feeder therefor, comprising a member in communication with the end of the conveyer and adapted to reciprocate in unison therewith, and a second member, longitudinally movable in relation to the first member, a cylinder on one of said members, a piston rod on the other, adapted to penetrate it, and a piston member on such rod.

2. The combination with a reciprocatory conveyer of a longitudinally extensible feeder therefor, comprising a member in communication with the end of the conveyer and adapted to reciprocate in unison therewith, and a second member, longitudinally movable in relation to the first member, a plurality of cylinders positioned on one of said members, a plurality of piston rods on the other, adapted to penetrate said cylinders, and piston members on such rods.

3. The combination with a reciprocatory conveyer of a longitudinally extensible feeder therefor, comprising a member in communication with the end of the conveyer and adapted to reciprocate in unison therewith, and a second member, longitudinally movable in relation to the first member, a cylinder on one of said members, a piston rod on the other, adapted to penetrate it, and a piston member on such rod, and means for admitting fluid under pressure to said cylinder.

4. The combination with a reciprocatory conveyer of a longitudinally extensible feeder therefor, comprising a member in communication with the end of the conveyer and adapted to reciprocate in unison therewith, and a second member, longitudinally movable in relation to the first member, a plurality of cylinders positioned on one of said members, a plurality of piston rods on the other, adapted to penetrate said cylinders, piston members on such rods, and means for admitting fluid under pressure to said cylinders.

5. The combination with a reciprocatory conveyer of a longitudinally extensible feeder therefor, comprising a member in communication with the end of the conveyer and adapted to reciprocate in unison therewith, and a second member, longitudinally movable in relation to the first member, a cylinder on one of said members, a piston rod on the other, adapted to penetrate it, a piston member on such rod, and means for admitting fluid under pressure to said cylinder, adjacent each end thereof.

6. The combination with a reciprocatory conveyer of a longitudinally extensible feeder therefor, comprising a member in communication with the end of the conveyer and adapted to reciprocate in unison therewith, and a second member, longitudinally movable in relation to the first member, a plurality of cylinders positioned on one of said members, a plurality of piston rods on the other, adapted to penetrate said cylinders, and piston members on such rods, and means for admitting fluid under pressure to said cylinders adjacent each end thereof.

7. The combination with a reciprocatory conveyer of a longitudinally extensible feeder therefor, comprising a member in communication with the end of the conveyer and adapted to reciprocate in unison therewith, and a second member, longitudinally movable in relation to the first member, a cylinder on one of said members, a piston rod on the other, adapted to penetrate it, and a piston member on such rod, a line adapted to deliver fluid under pressure to said cylinder, a connection between said line and each end of said cylinder, and valve means for separately controlling each such connection.

8. The combination with a reciprocatory conveyer of a longitudinally extensible feeder therefor, comprising a member in communication with the end of the conveyer and adapted to reciprocate in unison therewith, and a second member, longitudinally movable in relation to the first member, a plurality of cylinders positioned on one of said members, a plurality of piston rods on the other, adapted to penetrate said cylinders, piston members on such rods, a line adapted to deliver fluid under pressure, a plurality of pipes in communication therewith, one extending to each end of one of said cylinders and a branch connection extending from each such pipe to the end of another of such cylinders.

9. The combination with a reciprocatory conveyer of a longitudinally extensible feeder therefor, comprising a member in communication with the end of the conveyer and adapted to reciprocate in unison therewith, and a second member, longitudinally movable in relation to the first member, a plurality of cylinders positioned on one of said members, a plurality of piston rods on the other, adapted to penetrate said cylinders, piston members on such rods, a line adapted to deliver fluid under pressure, a plurality of pipes in communication therewith, one extending to each end of one of said cylinders and a branch connection extending from each such pipe to the end of another of such cylinders, and valve means for each of said pipes.

10. The combination with a reciprocatory conveyer of a longitudinally extensible feeder therefor, comprising a member in communication with the end of the conveyer and adapted to reciprocate in unison therewith, and a second member, longitudinally movable in relation to the first member, a plurality of cylinders positioned on one of said members, a plurality of piston rods on the other, adapted to penetrate said cylinders, piston members on such rods, a line adapted to deliver fluid under pressure, a plurality of pipes in communication therewith, one extending to each end of one of said cylinders and a branch connection extending from each such pipe to the end of another of such cylinders, and valve means for each of said pipes, each such valve means adapted to control its communication with each of the cylinders.

11. The combination with a reciprocatory conveyer of a longitudinally extensible feeder therefor, and fluid operated means for extending said feeder, such feeder being adapted to reciprocate in unison with the conveyer.

12. The combination with a reciprocatory conveyer of a longitudinally extensible feeder therefor, and fluid operated means for extending said feeder, said feeder comprising a member secured to and reciprocatory in unison with the conveyer, an additional member longitudinally movable in relation to said first member, and a cylinder and piston connection therebetween.

13. The combination with a reciprocatory conveyer of a longitudinally extensible feeder therefor and fluid operated means for extending said feeder, said feeder including a longitudinally movable member and a cylinder and piston connection between it and the conveyer.

14. The combination with a reciprocatory conveyer of a longitudinally extensible feeder therefor and fluid operated means for extending said feeder, said feeder comprising a plurality of nested troughs.

15. The combination with a reciprocatory conveyer of a longitudinally extensible feeder therefor and fluid operated means for extending said feeder, said feeder comprising a plurality of nested troughs, a cylinder on one of said troughs, a piston penetrating it and in connection with another of said troughs, a line adapted to direct an impelling fluid to said cylinder and connections between it and the opposite ends of said cylinder.

16. The combination with a reciprocatory conveyer of a longitudinally extensible feeder therefor and fluid operated means for extending said feeder, said feeder comprising a plurality of nested troughs, a cylinder on one of said troughs, a piston penetrating it and in connection with another of said troughs, a line adapted to direct an impelling fluid to said cylinder and connections between it and the opposite ends of said cylinder, and relief valves at the ends of said cylinder.

17. The combination with a reciprocatory conveyer of a longitudinally extensible feeder therefor, comprising a pair of troughs, a cylinder at each side of one of said troughs, a piston penetrating each of said cylinders and in connection with the other of said troughs, a line adapted to deliver an impelling fluid to said piston, connections between said line and the opposite ends of each of said pistons.

18. The combination with a reciprocatory conveyer of a longitudinally extensible feeder therefor, comprising a pair of troughs, a cylinder at each side of one of said troughs, a piston penetrating each of said cylinders and in connection with the other of said troughs, a line adapted to deliver an impelling fluid to said piston, connections between said line and the opposite ends of each of said pistons, and relief valves at each end of each piston.

19. The combination with a reciprocatory conveyer of a longitudinally extensible feeder therefor, comprising a pair of nested troughs, a plurality of rollers positioned in the bottom of the lower of said troughs and projecting upwardly through said bottom, the upper of said troughs being supported upon said rollers.

Signed at Kemmerer, county of Lincoln and State of Wyoming, this 22 day of October, 1926.

GOMAR REESE.